United States Patent [19]

Tiede

[11] Patent Number: 4,708,355
[45] Date of Patent: Nov. 24, 1987

[54] HIDEAWAY VEHICLE STEP

[76] Inventor: James Tiede, 651 80th St., Niagara Falls, N.Y. 14304

[21] Appl. No.: 897,501

[22] Filed: Aug. 18, 1986

[51] Int. Cl.⁴ .............................................. B60R 3/02
[52] U.S. Cl. ...................................... 280/166; 182/89
[58] Field of Search .................. 280/166, 164; 182/86, 182/89, 91, 97

[56] References Cited

U.S. PATENT DOCUMENTS

| | | | |
|---|---|---|---|
| 2,757,397 | 8/1956 | Valentine | 182/97 |
| 3,762,742 | 10/1973 | Bucklen | 280/166 |
| 3,980,319 | 9/1976 | Kirkpatrick | 280/166 |
| 4,231,583 | 11/1980 | Learn | 280/166 |

FOREIGN PATENT DOCUMENTS

| | | | |
|---|---|---|---|
| 563313 | 7/1977 | U.S.S.R. | 280/166 |
| 933503 | 6/1982 | U.S.S.R. | 280/166 |

Primary Examiner—David M. Mitchell
Attorney, Agent, or Firm—Donald C. Studley

[57] ABSTRACT

An extendable and retractable step for high clearance vehicles. The step is pivotally mounted enabling movement from a retracted, or concealed position, that is, one in which the step is stored beneath the sill of the vehicle door and adjacent the vehicle underbody, to an extended, or revealed position in which the step is projected outward and downward to provide access to the vehicle sill. The step has a positive bracing, or latching, means for assuring against undesired shifting of the step while it is in an extended position. The step unit, or assembly, includes a control system providing a means for moving the step unit from one position to the other and an indicating means to inform the vehicle operator of the step position.

8 Claims, 3 Drawing Figures

HIDEAWAY VEHICLE STEP

BACKGROUND OF THE INVENTION

The present invention generally relates to an extendable and retractable step unit for high clearance vehicles, such as, four wheel drive vehicles, campers and vans. Typically, the door opening in the cab or body of such vehicles is substantially higher than the door sill of a normal passenger-type automobile. Thus, it is difficult for many people to get in or out of such vehicles. More particularly, the present invention relates to a pivotally mounted step which is moveable between a retracted position, in which the step is completely stowed beneath the sill of the vehicle door, and an extended position, in which the step is projected below and beyond the sill to facilitate ease of ingress and egress.

Steps of four wheel vehicles, campers, vans and similar recreational type vehicles have been suggested in the past. For example, U.S. Pat. No. 3,888,510, Maske, is typical of a number of steps that have been proposed which are partially supported by the vehicle door and pivot outward to a position of use as the vehicle door is opened. U.S. Pat. No. 3,758,134, Stewart, and U.S. Pat. No. 2,544,799, McCann, relate to extended step units that pivotally move to retract if the step hits an obstruction. U.S. Pat. No. 4,231,583, Learn, relates to a step unit that is pivotally attached to the underframe, moving outward for use and inward for storage. Vehicle steps for high clearance vehicles are typically positioned on the underside of the vehicle, where they are susceptible to accidental contact with obstacles, such as, street curbs, rocks, stones, high road or ground surfaces. Additionally, such steps are directly exposed to fouling by close contact with road debris, water, mud and grime. It is postulated that the main reason that the prior art automatic vehicle steps have not been widely commercialized or broadly utilized is that the prior art devices, typically being complex in construction, simply do not provide the sturdiness, reliability and durability that is required. It is a purpose of the present invention to remedy the shortcomings of the prior art.

SUMMARY OF THE INVENTION

The present invention relates to an extendable and retractable step for high clearance vehicles. The step is pivotally mounted enabling movement from a retracted, or concealed position, that is, one in which the step is stored beneath the sill of the vehicle door and adjacent the vehicle underbody, to an extended, or revealed position in which the step is projected outward and downward to provide access to the vehicle sill. The step has a positive bracing, or latching, means for assuring against undesired shifting of the step while it is in an extended position. The step unit, or assembly, includes a control system providing a means for moving the step unit from one position to the other and an indicating means to inform the vehicle operator of the step position. Typically the control system provides automatic extention of the step when the vehicle door is opened and automatic retraction of the step when the vehicle door is closed. Preferably the control system also includes an optional means enabling the operator to selectively place the step in either an extended or retracted position regardless of the status of the door.

The present step is characterized by simplicity in design and the capability to be compactly stowed in a substantially flat manner adjacent the vehicle underbody without decreasing the road clearance of the vehicle. Preferably the step stows substatially flat over the top of a frame member of the vehicle. The simplicity of the unit and the compact storage capability combine to substantially reduce exposure of the present step to road hazards and adverse conditions.

BRIEF DESCRIPTION OF THE INVENTION

The present invention relates to a pivotally mounted, vehicle step for high clearance vehicles. The step has an extended and a retracted position. The step assembly is comprised of an anchoring means, a step unit, a bracing means, an actuating means and a control means. The anchoring means is suitably an anchor plate rigidly attached to the vehicle underside. The step unit is comprised of elongated frame members arranged in parallel. The frame members have a treadle, or step, positioned across their bottom portions, a cross-support piece positioned across their intermediate portions and a top support plate positioned across their top portions. The top support plate has a vertically extending connector tab to enable the step unit top be pivotally secured to the anchoring means. The bracing means is suitably comprised of a sliding lock brace having a cylinder, a connecting rod which is freely moveable within the cylinder and a movement-limiting means for limiting movement of the rod within the cylinder. One end of the bracing means is pivotally attached to the vehicle underside. The other end of the bracing means is pivotally attached to the cross-support piece positioned on the step unit. When the step is in an extended position, the movement-limiting means prevents the connecting rod from further entry into the cylinder, thereby bracing the step unit against the vehicle underframe. When the step in in a retracted position it is preferably stored substantially flat adjacent a portion of the underbody of the vehicle. An actuating means is provided to move the step unit to and from the extended and the retracted positions. A control means is provided to actuate the actuating means.

DETAILED DESCRIPTION OF THE INVENTION

The invention will be better understood from the following description taken in conjunction with the accompanying drawings in which like numbers refer to like components throughout the several views.

Figure 1:
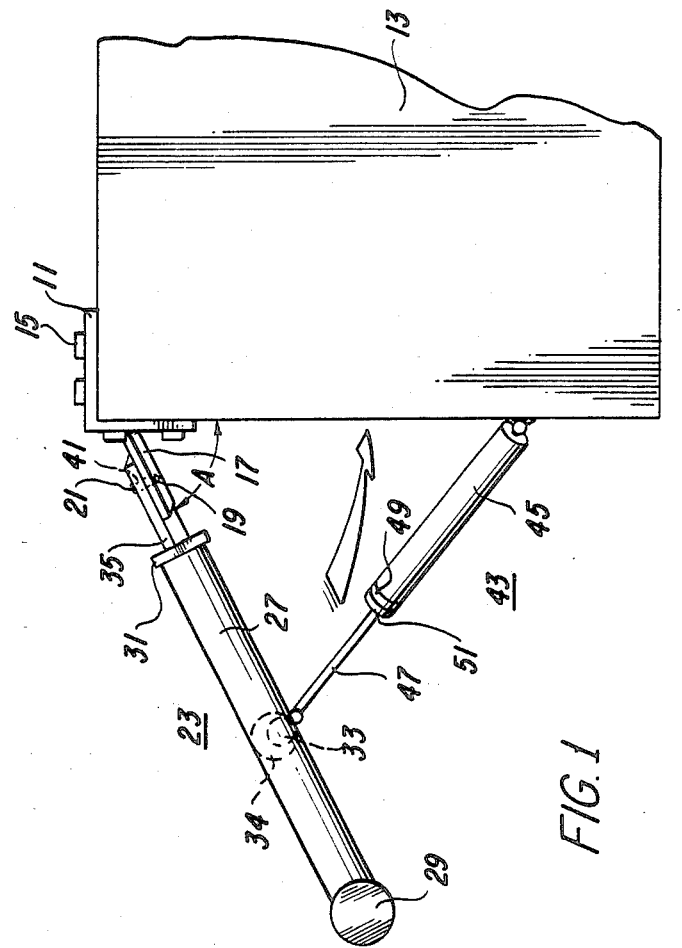
FIG. 1 is a side elevational view showing the step unit in an extended position as it would appear attached to the vehicle frame, the vehicle frame is shown in fragmentary form.
Figure 2:
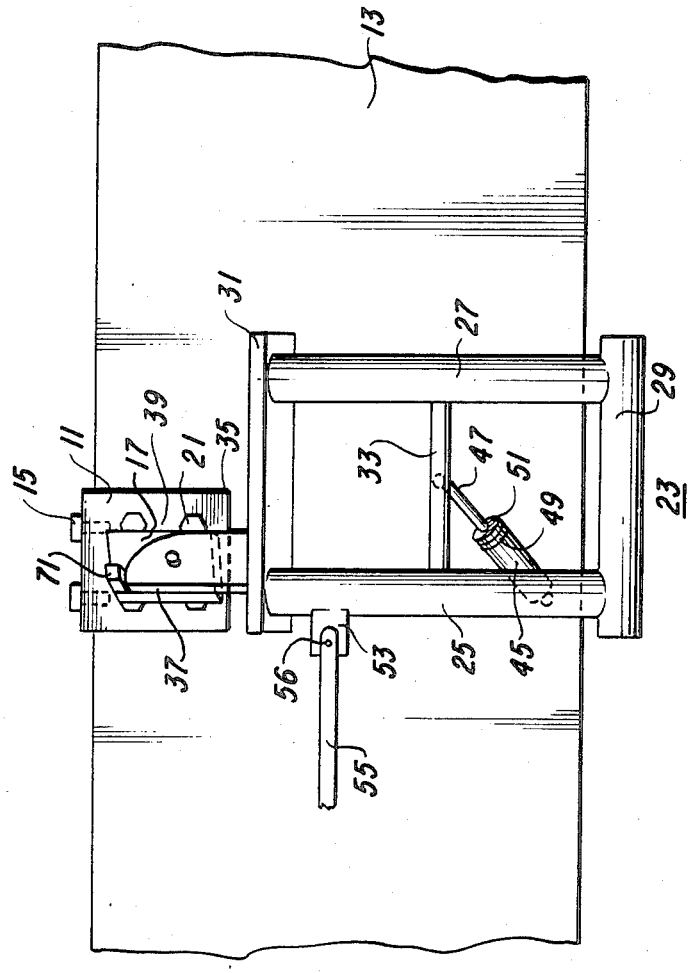
FIG. 2 is a front elevational of the step as shown in FIG. 1.
Figure 3:
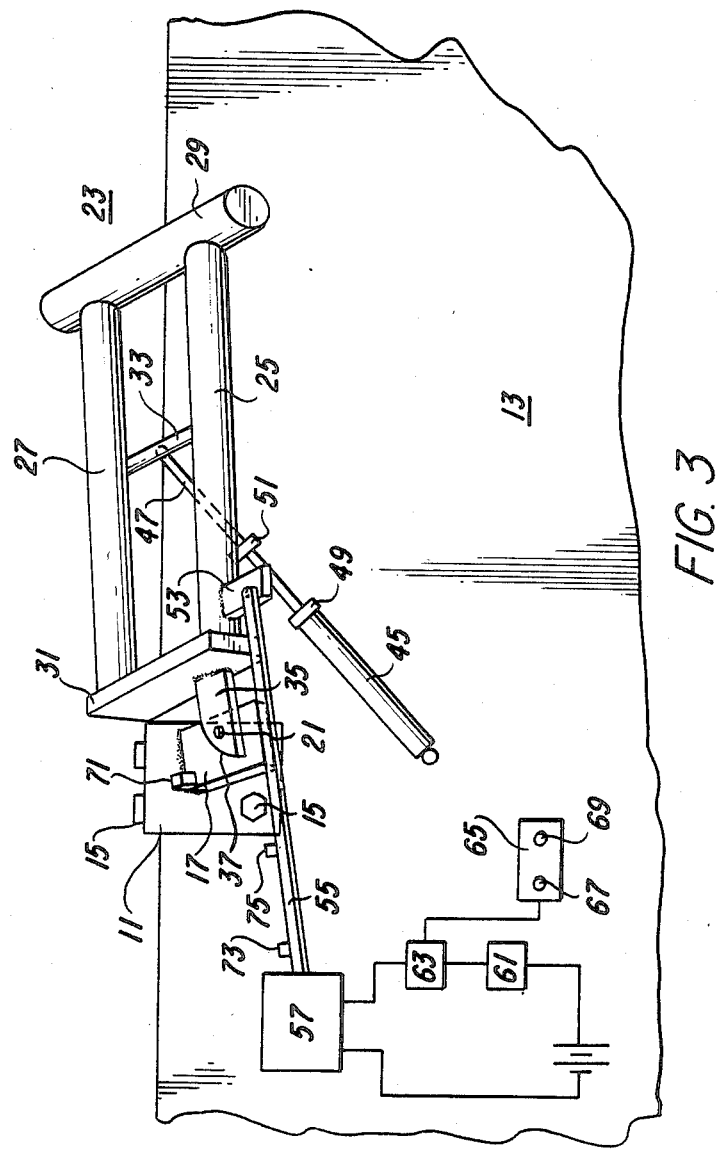
FIG. 3 is a front elevational view of the step shown in FIGS. 1 and 2 in a retracted position.

Looking now at the Ffigures in detail, FIGS. 1 and 2 show the step unit in an extended, or operative position. FIG. 3 shows the step unit in a retracted position as it would be preferably stored in a substantially flat manner adjacent a portion of the vehicle underbody. The present step unit may retract by movement of the step toward the front or toward the rear of the vehicle, preferably the step unit retracts toward the rear of the vehicle.

An anchoring means, such as, anchor, or base, plate 11, is rigidly secured to a rigid stationary part of the vehicle underside, for example, the vehicle frame, or chasis 13. The anchoring means 11 may suitably be attached by welding or by a plurality of spaced apart bolts, such as, 15. Anchor plate 11 has an extended bearing lug 17 laterally secured thereto. Bearing lug 17 has an opening, 19, therein to align with and receive pivot shaft 21.

Bearing lug 17 slopes downward from the vertical surface of the anchor plate 11 at an angle between about 20 and about 80 degrees, and more preferably between about 45 and about 65 degrees. Bearing lug 17 is also canted, that is, sloped downward in a direction toward the step unit at an angle between about 3 and about 25, and more preferably, at an angle between about 5 and about 20 degrees. The downward slope of bearing lug 17 can best be seen in FIG. 1, wherein the downward angle is designated as "A". The cant of bearing lug 17 can best be seen in FIG. 2 wherein the cant of lug 17 is shown somewhat exaggerated for purposes of illustration.

A step unit, generally denoted as 23, is comprised of spaced apart, elongated step frame members, or rails, 25 and 27, arranged in parallel, a bottom treadle, or step platform, 29 positioned across the bottom portion of the frame members, a top, or end support plate 31, and a cross-support piece 33 positioned between and across the frame members at a point intermediate the bottom treadle and the top support plate. Treadle 29 may vary in size and length, but it preferably is of a width to readily receive a person's foot and typically varies in width between about eight and about twelve inches. The step unit may include additional treadle or rungs, such as 34 shown in phantom in FIG. 1, positioned across frame members 25 and 27. The upper surface of the treadle members may be milled or knurled to provide a anti-slip surface. Step frames 25 and 27 are secured across their top portions by top support plate 31 and at their bottom portions by bottom treadle 29, forming a flat rectangular configuration. The flat rectangularly shaped step unit is adapted to snugly fit in a substantially flat manner adjacent a longitudinal portion of the vehicle underbody, preferably the vehicle frame or chasis, 13, in a manner which does not decrease the road clearance of the vehicle. Step frame members 25 and 27 are suitably fabricated of tubular steel, preferably between about 1½ to about 2 inches in cross-section to provide the step user with a large amount of treadle area and to give the user a sense of security when using the step without adding an undue weight to the unit. Tubular steel having a square cross-section may aptly be used for treadle 29 to provide a flat step surface. The components of the step unit are suitably secured together by welding.

Step unit 23 has a vertically extending, substantially flat, connector tab 35 secured along the top portion of top support plate 31. Connection tab 35 preferably has a flat side surface, such as, 37, and preferably a generally rounded edge portion, such as, 39. Connector tab 35 extends outward from the top of the step unit. Connector tab 35 may be angled as shown in FIG. 3 to facilitate a suitable rotation of the step unit into a desired storage position, or may be positioned in substantially the same plane as step frames 25 and 27. Connector tab 35 has opening 41 therein to receive pivot shaft 21.

A bracing means provides a brace between step unit 23 and the vehicle underside 13 when the step unit is in an extended position. Suitably the bracing means is comprised of a sliding lock brace, such as, 43. Sliding lock brace 43 has a cylinder 45 and connecting rod 47. Connecting rod 47 freely moves within cylinder 45. Cylinder 45 and connecting rod 47 have separate, adjustable movement limiting means, such as, ring stops 49 and 51 preventing connecting rod 47 from further entry into cylinder 45. One end of the bracing means is rotatably attached to the vehicle frame 13, and the remaining end is rotatably attached to cross-support piece 33 on step unit 23. Although either end of bracing means 43 may be attached to the vehicle underside, it is preferred that the cylinder end be attached to the vehicle frame to provide added stability. As shown in the drawings, the cylinder end of support brace 43 is rotatably attached to the vehicle frame 13. Brace 43 is pivotally attached to the vehicle underbody at a point beneath the pivot point of pivot shaft 21. Brace 43 may be pivotally attached to the vehicle underbody either slightly toward the direction that step unit 23 moves as it moves to a retracted position, or in substantially vertically alignment with the pivot point of pivot shaft 21. The rod end of support brace 43 is pivotally attached to cross-support piece, 33 positioned between, step frames 25 and 27. If additional treadles, or steps, such as 34, are utilized, connecting rod 47 may attach to the vehicle side of one of such additional treadles. In which case the additional treadle would act doubly as a step and as a cross-support piece. Stop ring 49 on cylinder 45 and stop ring 51 on connecting rod 47 abutt each other when the step unit is in a down, or extended, position, as shown in FIGS. 1 and 2. When step unit 23 moves to an up, or retracted position, as illustrated in FIG. 3, stops 49 and 51 move apart allowing free rotational movement of the unit.

Step unit 23 has a sidewardly extending connecting lug, or tab, 53, shown best in FIG. 2, rigidly positioned on the upper side portion of step frame 25. Lug 53 is pivotally connected to lever arm 55 through pivot shaft 56. Step unit 23 is moved to and from retracted and extended positions by the reciprical movement of lever arm 55. As shown in FIG. 3, lever arm 55 is suitably moved by an actuating means, 57, which suitably may be a solenoid coil, or more preferably, a reversible electric motor. Actuating means 57 is powered by a power source, typically a battery, such as, 59. Preferably actuating means 57 is direct current powered facilitating use of the vehicle battery. Switching means, such as, 61 and 63 are positioned in the circuit connecting current source 59 to the actuating means 51. Suitably one operating switch, for example, 61, is activated by the opening and closing of the vehicle door. The other operating switch, such as, 63, may be more remotely located, suitably in the cab of the vehicle, to enable independent operation of the step no matter the position of the door. Preferably an indicating means, such as 65, is also located aboard the vehicle to indicate the position of the step, or steps, by means of indicating lights, such as, 67 and 69.

In typical operation when the door of the vehicle (not shown) is opened, operating switch 61 is actuated. Switch 61 connects the activating means, 57, to power source, 59. Lever arm 55 is caused to move and being pivotally connected to step unit 23 by connecting lug 53 causes step unit 23 to pivot downward from a retracted position toward an extended position. Step unit 23 pivotally moves until flat surface 37 of connection tab 35 contacts stop 71, preferably at the same time stop rings 49 and 51 meet. The activating means 57 is suitably equipped with limit switches, such as, 73 and 75 secured to arm 55, or if desired the switches may be located on anchor plate 11. The limit switches are connected into the electrical circuit which includes activating means 57 and are arranged to stop activating means 57 at the two limit positions of step unit 23, by disconnecting the actuating means from the power source, thus avoiding an overload on the activating means. The wiring arrangement between the activating means and the limit switches is accomplished in a manner well known in the art and therefore is not illustrated.

When the step unit is in an extended position, any weight placed on treadle 29 forces stop rings 49 and 51 closer together providing a locking action on bracing means 43, thus holding step unit 23 in a secure extended position by providing a rigid brace between step unit 23 and the vehicle frame 13.

As the door is closed, step unit 23 is moved by lever arm 55 to an upward position. The movement is uninhibited as the movement is away from stop 71 and pulls connecting rod 47 with attached ring stop 49 in a direction away from cylinder 45 and stop ring 51.

Obviously many modifications and variations of the invention as set forth herein may be made without departing from the spirit and scope thereof, and therefore only such limitations should be imposed as are indicated in the appended claims.

What is claimed is:

1. A pivotally mounted vehicle step assembly for use on high clearance vehicles, said step unit having an extended position wherein the step unit provides access to the vehicle and a retracted position wherein the step is stored adjacent the vehicle underbody comprising:
    (a) an anchoring means rigidly secured to a rigid stationary part of the underside of said high clearance vehicle,
    (b) a step unit pivotally attached to said anchoring means, said step unit comprised of:
        (1) a pair of rigid, spaced apart, parallel step frame members,
        (2) a bottom treadle positioned between and across the bottom portion of said step frame members,
        (3) a top support plate positioned between and across the top portion of said frame members,
        (4) a cross-support piece positioned between and across an intermediate portion of said frame members, and,
        (5) a single vertically extending connector tab positioned atop said top support plate for pivotally attaching said step unit to a pivot point on said anchoring means,
    (c) a bracing means to brace said step unit, when said step unit is in an extended position, against said vehicle underside, one end of said bracing means pivotally attached to said vehicle underside at a point below and in substantial alignment with the pivot point of said step unit, and one end of said bracing means pivotally attached at an intermediate portion of said cross-support piece on said step unit, said bracing means comprising:
        (1) a cylinder having a connecting rod therein, said connecting rod moveable freely within said cylinder,
        (2) said cylinder and said connecting rod having movement limiting means thereon to limit the amount that the connecting rod can enter said cylinder, and
        (3) said movement limiting means preventing further entry of the connecting rod in said cylinder when the said step unit is in an extended position,
    (d) an actuating means to move said step unit to and from said extended to said retracted position, and
    (e) a control means to activate said actuating means.

2. The vehicle step of claim 1 wherein said movement limiting means are stop rings.

3. The vehicle step of claim 1 wherein said frame members are tubular.

4. The vehicle step of claim 1 wherein said actuating means is a reversible electric motor.

5. The vehicle step of claim 1 wherein said actuating means is battery powered.

6. The vehicle step of claim 1 wherein the said control means is activated by the opening or closing of a door on said vehicle.

7. The vehicle step of claim 1 wherein said actuating means is electrical.

8. The vehicle step of claim 7 wherein said said electrical actuating means is a battery.

* * * * *